US010827325B2

United States Patent
Hahn

(10) Patent No.: US 10,827,325 B2
(45) Date of Patent: Nov. 3, 2020

(54) METHOD FOR TRANSMITTING AND RECEIVING DATA USING HETEROGENEOUS RADIO ACCESS TECHNOLOGY IN COMMUNICATION SYSTEM SUPPORTING VEHICLE-TO-EVERYTHING COMMUNICATION AND APPARATUS FOR THE SAME

(71) Applicants: Hyundai Motor Company, Seoul (KR); Kia Motors Corporation, Seoul (KR)

(72) Inventor: Gene Beck Hahn, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 38 days.

(21) Appl. No.: 16/256,230

(22) Filed: Jan. 24, 2019

(65) Prior Publication Data

US 2019/0230485 A1 Jul. 25, 2019

Related U.S. Application Data

(60) Provisional application No. 62/621,840, filed on Jan. 25, 2018.

(30) Foreign Application Priority Data

Jan. 10, 2019 (KR) .................. 10-2019-0003435

(51) Int. Cl.
*H04B 7/00* (2006.01)
*H04W 4/40* (2018.01)
(Continued)

(52) U.S. Cl.
CPC .............. *H04W 4/40* (2018.02); *H04L 43/16* (2013.01); *H04W 4/027* (2013.01); *H04W 24/08* (2013.01);
(Continued)

(58) Field of Classification Search
CPC ......... H04W 4/04; H04W 4/04; H04W 4/044; H04W 4/046; H04W 36/0066; H04W 36/0069
(Continued)

(56) References Cited

U.S. PATENT DOCUMENTS 8,615,230 B2 * 12/2013 Wu .................. H04W 36/0066
455/424
8,767,571 B2 * 7/2014 Faurie .................... H04W 8/24
370/252

(Continued)

OTHER PUBLICATIONS

Mobility for dual connectivity, 3GPP, R2-130990, Apr. 2013, 6 pages.*

*Primary Examiner* — Dmitry Levitan
(74) *Attorney, Agent, or Firm* — Mintz Levin Cohn Ferris Glovsky and Popeo, P.C.; Peter F. Corless

(57) ABSTRACT

An operation method of a terminal in a V2X communication system may include: transmitting, by the terminal, a first radio resource control (RRC) message to a base station supporting a first radio access technology (RAT), the first RRC message including information indicating that the terminal supports multiple RATs including at least a first RAT and a second RAT; receiving, by the terminal, a second RRC message from the base station, the second RRC message including information indicating that multi-RAT based operations are allowed; transmitting, by the terminal, a resource request message for requesting resource allocation for V2X communication to an access point supporting the second RAT when a channel busy ratio (CBR) measure-
(Continued)

ment result is greater than or equal to a CBR threshold in a channel configured by the base station; receiving, by the terminal, from the access point a resource allocation message including resource allocation information in response to the resource request message; and transmitting, by the terminal, data to the access point using a radio resource indicated by the resource allocation message.

19 Claims, 8 Drawing Sheets

(51) Int. Cl.
   *H04W 76/27* (2018.01)
   *H04W 24/10* (2009.01)
   *H04W 80/02* (2009.01)
   *H04L 12/26* (2006.01)
   *H04W 4/02* (2018.01)
   *H04W 24/08* (2009.01)
   *H04W 72/02* (2009.01)

(52) U.S. Cl.
   CPC ........... *H04W 24/10* (2013.01); *H04W 72/02* (2013.01); *H04W 76/27* (2018.02); *H04W 80/02* (2013.01)

(58) Field of Classification Search
   USPC .................................................. 370/310–332
   See application file for complete search history.

(56) References Cited

U.S. PATENT DOCUMENTS

| | | | |
|---|---|---|---|
| 9,215,618 B2* | 12/2015 | Sasaki | H04W 28/08 |
| 10,194,446 B2* | 1/2019 | Gholmieh | H04W 72/048 |
| 10,299,180 B2* | 5/2019 | Hong | H04W 56/001 |
| 10,383,023 B1* | 8/2019 | Hahn | H04W 36/0066 |
| 10,536,917 B2* | 1/2020 | Chandramouli | H04W 68/02 |
| 2016/0057729 A1* | 2/2016 | Horn | H04W 68/005 |
| | | | 455/458 |
| 2018/0020386 A1* | 1/2018 | Chandramouli | H04W 36/0027 |
| 2018/0092010 A1* | 3/2018 | Chandrashekar | H04W 48/18 |
| 2019/0037430 A1* | 1/2019 | Lee | H04L 43/16 |
| 2019/0098564 A1* | 3/2019 | Gupta | H04W 48/16 |
| 2019/0110175 A1* | 4/2019 | Chun | H04W 4/40 |
| 2019/0110178 A1* | 4/2019 | Baghel | H04L 67/12 |
| 2019/0132790 A1* | 5/2019 | Lee | H04W 76/27 |
| 2019/0149417 A1* | 5/2019 | Augusto Lopes | H04L 41/0816 |
| | | | 370/254 |
| 2019/0230485 A1* | 7/2019 | Hahn | H04W 72/0486 |
| 2019/0289505 A1* | 9/2019 | Thomas | H04W 36/08 |
| 2020/0084683 A1* | 3/2020 | Moosavi | H04W 36/24 |

* cited by examiner

PRIOR ART

PRIOR ART

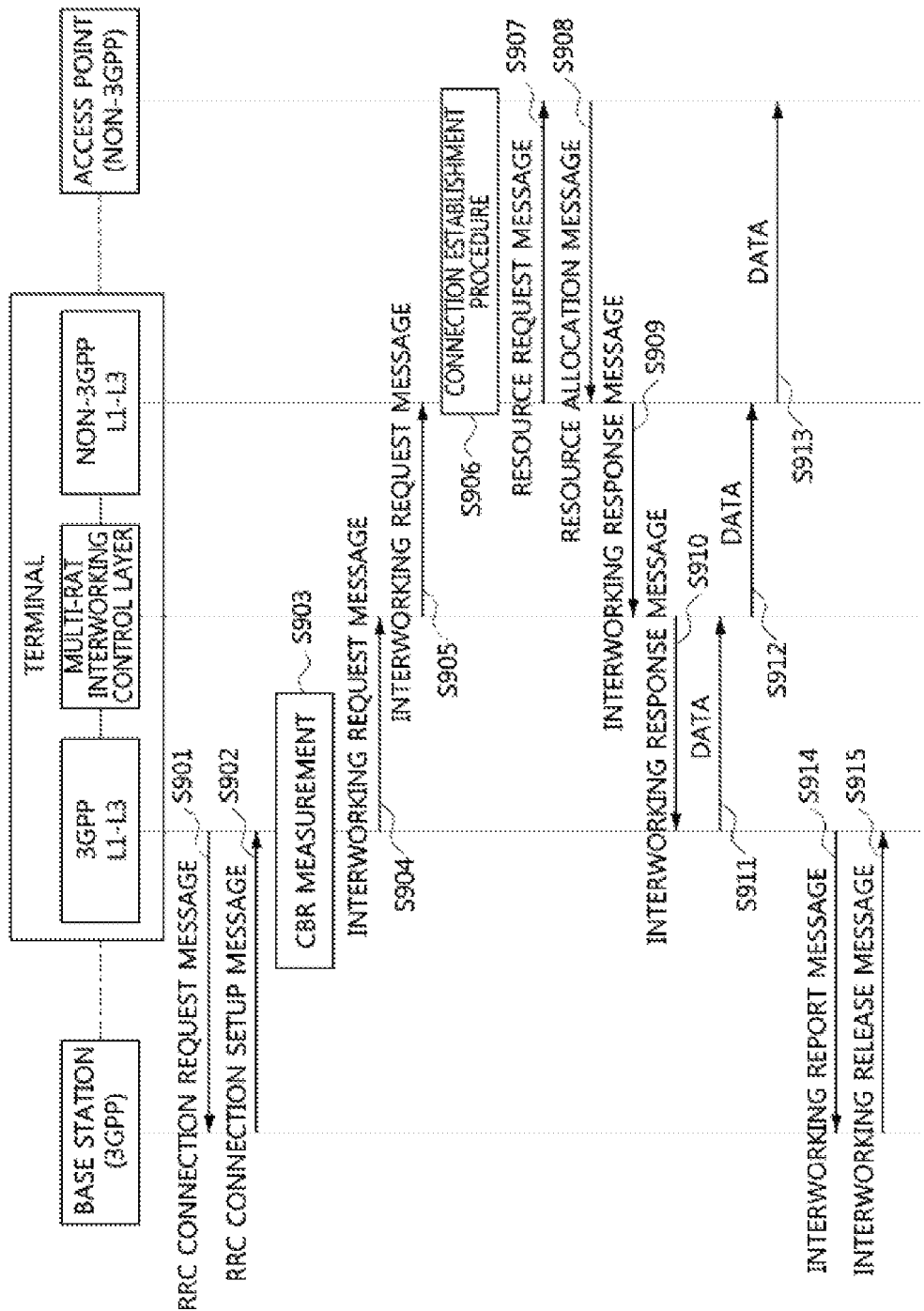

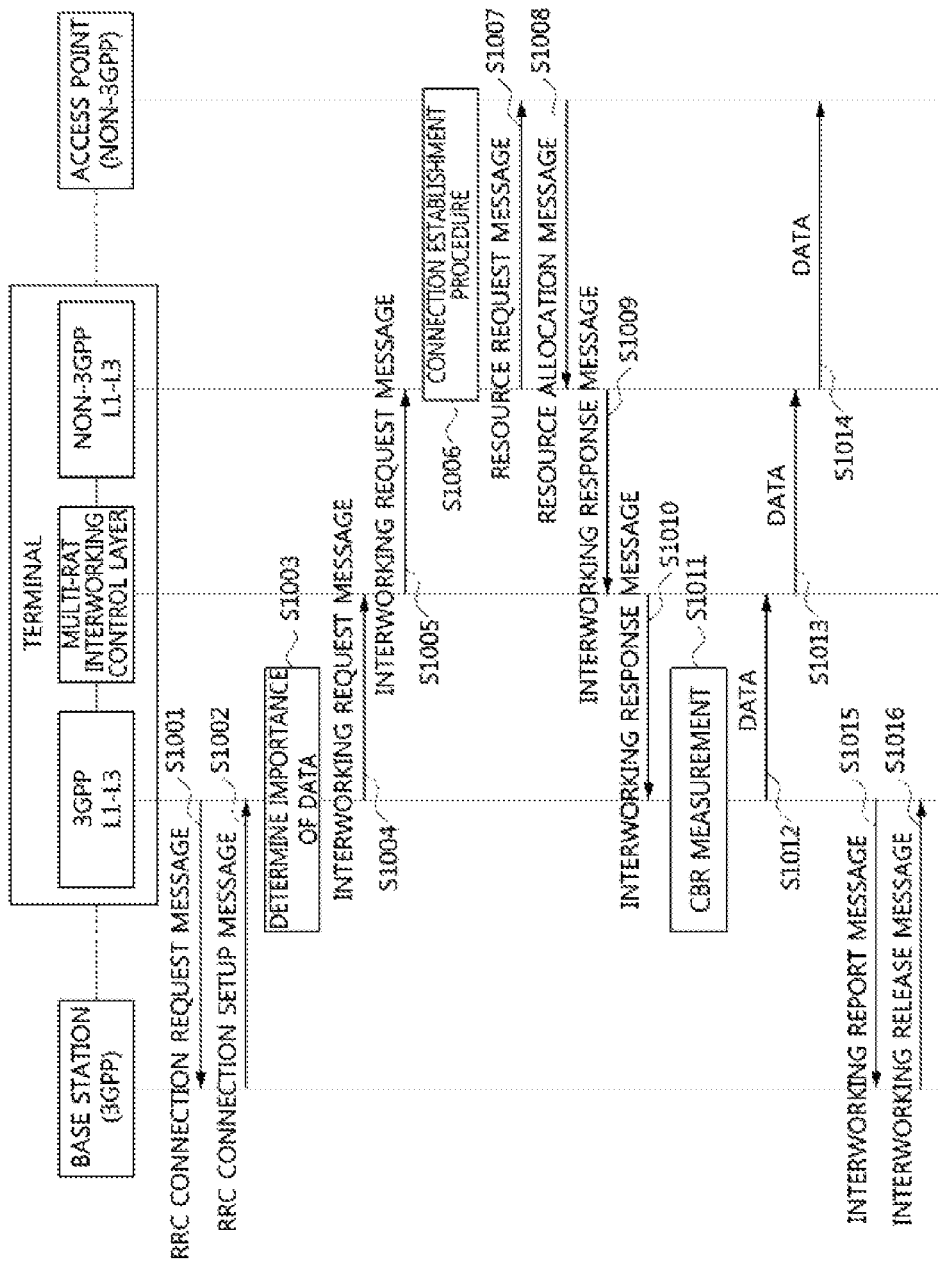

METHOD FOR TRANSMITTING AND RECEIVING DATA USING HETEROGENEOUS RADIO ACCESS TECHNOLOGY IN COMMUNICATION SYSTEM SUPPORTING VEHICLE-TO-EVERYTHING COMMUNICATION AND APPARATUS FOR THE SAME

CROSS-REFERENCE TO RELATED APPLICATION

This application claims the benefit of priority to U.S. Provisional Patent Application No. 62/621,840, filed on Jan. 25, 2018, and Korean Patent Application No. 10-2019-0003435, filed on Jan. 10, 2019 in the Korean Intellectual Property Office (KIPO), the entire contents of which are incorporated herein by reference.

BACKGROUND

1. Technical Field

The present disclosure relates generally to vehicle-to-everything (V2X) communication, and more specifically, to methods and apparatuses for transmitting and receiving data using heterogeneous radio access technology (RAT) in a vehicle-to-everything (V2X) communication system.

2. Related Art

Various systems have been developed for processing of wireless data such as the fourth-generation (4G) communication system (e.g., Long Term Evolution (LTE) communication system or LTE-Advanced (LTE-A) communication system) and the fifth-generation (5G) communication system (e.g., New Radio (NR) communication system), which uses a frequency band higher than the frequency band of the 4G communication system. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In many cellular communication systems, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels.

In cellular communication systems supporting V2X communications (e.g., C-V2X communication), a terminal located in a vehicle may perform the V2X communications using a resource allocated by a base station or a resource arbitrarily selected within a resource pool configured by the base station. The terminal may measure a channel busy ratio (CBR) periodically or when a preset event occurs, and may transmit a measurement result of the CBR to the base station. The base station may receive the measurement result of the CBR from the terminal, and identify a channel congestion based on the measurement result of the CBR. The base station may also adjust transmission parameters (e.g., modulation and coding scheme (MCS), maximum transmission power, range of retransmission counts per transport block (TB), etc.) based on channel congestion.

Meanwhile, when it is determined that a congestion degree of a channel #n is high according to the measurement result of the CBR, and that reliability/latency requirements (e.g., URLLC requirements) of the data to be transmitted by the terminal in the channel #n are not satisfied, the resource or resource pool for V2X communication should be reconfigured. However, the base station is able to only adjust the transmission parameters according to the measurement result of the CBR, and does not support a resource or resource pool reconfiguration procedure for V2X communication.

SUMMARY

Accordingly, embodiments of the present disclosure provide a method and an apparatus for transmitting and receiving data through heterogeneous RATs in a communication system supporting the V2X communication.

According to embodiments of the present disclosure, an operation method of a terminal located in a vehicle supporting a vehicle-to-everything (V2X) communication system may include: transmitting, by the terminal, a first radio resource control (RRC) message to a base station supporting a first radio access technology (RAT), the first RRC message including information indicating that the terminal supports multiple RATs including at least a first RAT and a second RAT; receiving, by the terminal, a second RRC message from the base station, the second RRC message including information indicating that multi-RAT based operations are allowed; transmitting, by the terminal, a resource request message for requesting resource allocation for V2X communication to an access point supporting the second RAT when a channel busy ratio (CBR) measurement result is greater than or equal to a CBR threshold in a channel configured by the base station; receiving, by the terminal, from the access point a resource allocation message including resource allocation information in response to the resource request message; and transmitting, by the terminal, data to the access point using a radio resource indicated by the resource allocation message.

The terminal may include layers 1 to 3 supporting the first RAT, layers 1 to 3 supporting the second RAT, and an interworking control layer for supporting interworking between the first RAT and the second RAT.

The second RRC message may further include the CBR threshold and a list of access points including the access point supporting the second RAT.

The second RRC message may further include a CBR threshold #1, a CBR threshold #2, and a speed threshold; the CBR threshold may correspond to the CBR threshold #1 when a speed of the terminal is greater than or equal to the speed threshold; the CBR threshold may correspond to the CBR threshold #2 when the speed of the terminal is less than the speed threshold; and the CBR threshold #1 may be different from the CBR threshold #2.

The first RRC message may be an RRC connection request message, and the second RRC message may be an RRC connection setup message.

The resource request message may include at least one of a size of the data transmitted to the access point, a transmission cycle of the data transmitted to the access point, a priority of the data transmitted to the access point, and transmission requirements of the data transmitted to the access point.

The resource allocation message may include information indicating the radio resource allocated by the access point and information indicating an offset period, and the radio resource may be released when data is not received from the terminal within the offset period.

The operation method may further include, when the resource allocation message is received from the access point, transmitting, by the terminal, to the base station an interworking report message indicating that the terminal performs V2X communication with the access point.

Furthermore, in accordance with embodiments of the present disclosure, an operation method of a terminal located in a vehicle supporting a vehicle-to-everything (V2X) communication system, may include: transmitting, by the terminal, a first radio resource control (RRC) message to a base station supporting a first radio access technology (RAT), the first RRC message including information indicating that the terminal supports multiple RATs including at least a first RAT and a second RAT; receiving, by the terminal, a second RRC message from the base station, the second RRC message including information indicating that multi-RAT based operations are allowed; transmitting, by the terminal, a resource request message for requesting resource allocation for V2X communication to an access point supporting the second RAT when an importance of data generated by the terminal is higher than a preset reference; receiving, by the terminal, from the access point a resource allocation message including resource allocation information in response to the resource request message; and transmitting, by the terminal, the data generated by the terminal to the access point using a radio resource indicated by the resource allocation message when a channel busy ratio (CBR) of the data generated by the terminal is greater than or equal to a CBR threshold in a channel configured by the base station.

The terminal may include layers 1 to 3 supporting the first RAT, layers 1 to 3 supporting the second RAT, and an interworking control layer for supporting interworking between the first RAT and the second RAT.

The importance of the data generated by the terminal may be determined to be higher than the preset reference when the data includes ultra-reliable and low latency communication (URLLC) data.

The second RRC message may further includes the CBR threshold and a type of the data, and when the type of the data generated by the terminal is identical to a type indicated by the second RRC message, the importance of the data generated by the terminal may be determined to be higher than the preset reference.

The second RRC message further includes a CBR threshold #1, a CBR threshold #2, and a speed threshold; the CBR threshold may correspond to the CBR threshold #1 when a speed of the terminal is greater than or equal to the speed threshold; the CBR threshold may correspond to the CBR threshold #2 when the speed of the terminal is less than the speed threshold; and the CBR threshold #1 may be different from the CBR threshold #2.

The resource request message may include at least one of a size of the data generated by the terminal, a transmission cycle of the data generated by the terminal, a priority of the data generated by the terminal, and transmission requirements of the data generated by the terminal.

The resource allocation message may include information indicating the radio resource allocated by the access point and information indicating an offset period, and the radio resource may be released when data is not received from the terminal within the offset period.

The operation method may further include, when the resource allocation message is received from the access point, transmitting, by the terminal, to the base station an interworking report message indicating that the terminal performs V2X communication with the access point.

Furthermore, in accordance with embodiments of the present disclosure, a terminal located in a vehicle supporting a vehicle-to-everything (V2X) communication system, may include: a first radio access technology (RAT) layer configured to perform layer 1 to layer 3 functions supporting a first RAT; a second RAT layer configured to perform layer 1 to layer 3 functions supporting a second RAT; and an interworking control layer configured to perform an interworking function between the first RAT and the second RAT. The first RAT layer may receive a first radio resource control (RRC) message from the base station, the first RRC message including information indicating that multi-RAT based operations are allowed, and transmit data to the interworking control layer when a channel busy ratio (CBR) measurement result is greater than or equal to a CBR threshold in a channel configured by the base station, the interworking control layer may transfer the data received from the first RAT layer to the second RAT layer, and the second RAT layer may transmit the data received from the interworking control layer to an access point using a radio resource configured by the access point supporting the second RAT.

The first RAT layer may transmit an interworking request message instructing the terminal to perform V2X communication with the access point to the interworking control layer when the CBR measurement result is greater than or equal to the CBR threshold; the interworking control layer may transfer the interworking request message received from the first RAT layer to the second RAT layer; when the interworking request message is received from the interworking control layer, the second RAT layer may transmit a resource request message requesting resource allocation for transmission of the data to the access point, and may receive a resource allocation message including resource allocation information from the access point; and the data transmitted to the interworking control layer may be transmitted to the access point using the radio resource indicated by the resource allocation information.

The second RAT layer may transmit an interworking response message indicating that the resource for the transmission of the data to the access point is allocated to the interworking control layer when the resource allocation message is received from the access point; the interworking control layer may transmit the interworking response message received from the second RAT layer to the first RAT layer; and the first RAT layer may receive the interworking response message from the interworking control layer.

The first RAT layer may transmit an interworking request message instructing the terminal to perform V2X communication with the access point to the interworking control layer, when the importance of the data transmitted to the interworking control layer is determined to be higher than a preset reference after the first RRC message is received; the interworking control layer may transfer the interworking request message received from the first RAT layer to the second RAT layer; the second RAT layer may transmit a resource request message requesting resource allocation for transmission of the data to the access point when the interworking request message is received from the interworking control layer, and may receive a resource allocation message including resource allocation information from the access point; and a CBR measurement may be performed after the resource allocation for the transmission of the data to the interworking control layer is completed.

According to the embodiments of the present disclosure, the terminal can measure a CBR, and based on a measurement result of the CBR, the terminal may determine whether reliability/latency requirements (e.g., URLLC requirements) of data to be transmitted by the terminal are satisfied in a current channel. When the reliability/latency requirements of the data to be transmitted by the terminal are not satisfied in the current channel, the terminal can request resource allocation to the access point supporting the non-3GPP communication technology (e.g., wireless access in vehicular environment (WAVE)). The terminal may perform V2X communication using a resource allocated by the access point.

In addition, when importance of data generated in the terminal is high (e.g., when URLLC data is generated), the terminal can request resource allocation to the access point supporting the non-3GPP communication technology, and receive resource allocation information from the access point. Thereafter, the terminal can measure the CBR and perform V2X communication using the resource allocated by the access point when the CBR measurement result is equal to or higher than a threshold value.

BRIEF DESCRIPTION OF DRAWINGS

Embodiments of the present disclosure will become more apparent by describing in detail embodiments of the present disclosure with reference to the accompanying drawings, in which:

FIG. 9 is a sequence chart illustrating a first embodiment of a V2X communication method over a heterogeneous RAT in a V2X communication system; and FIG. 10 is a sequence chart illustrating a second embodiment of a V2X communication method over a heterogeneous RAT in a V2X communication system.

Figure 1:
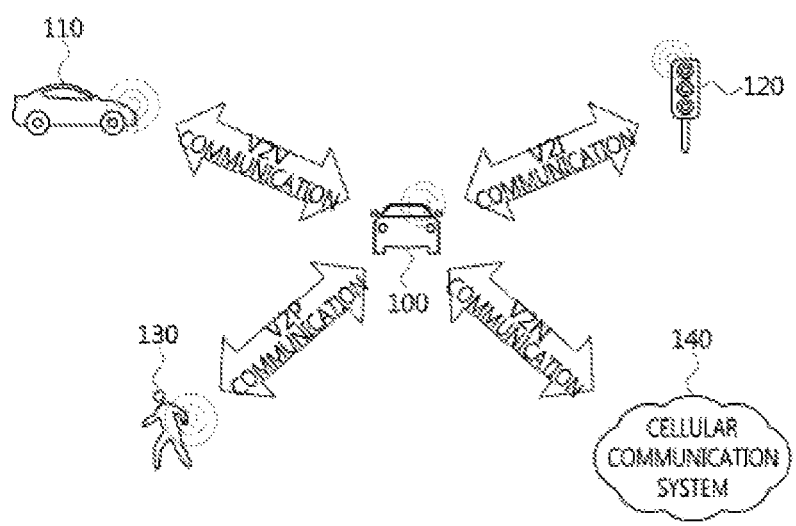
FIG. 1 is a conceptual diagram illustrating V2X communication scenarios.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
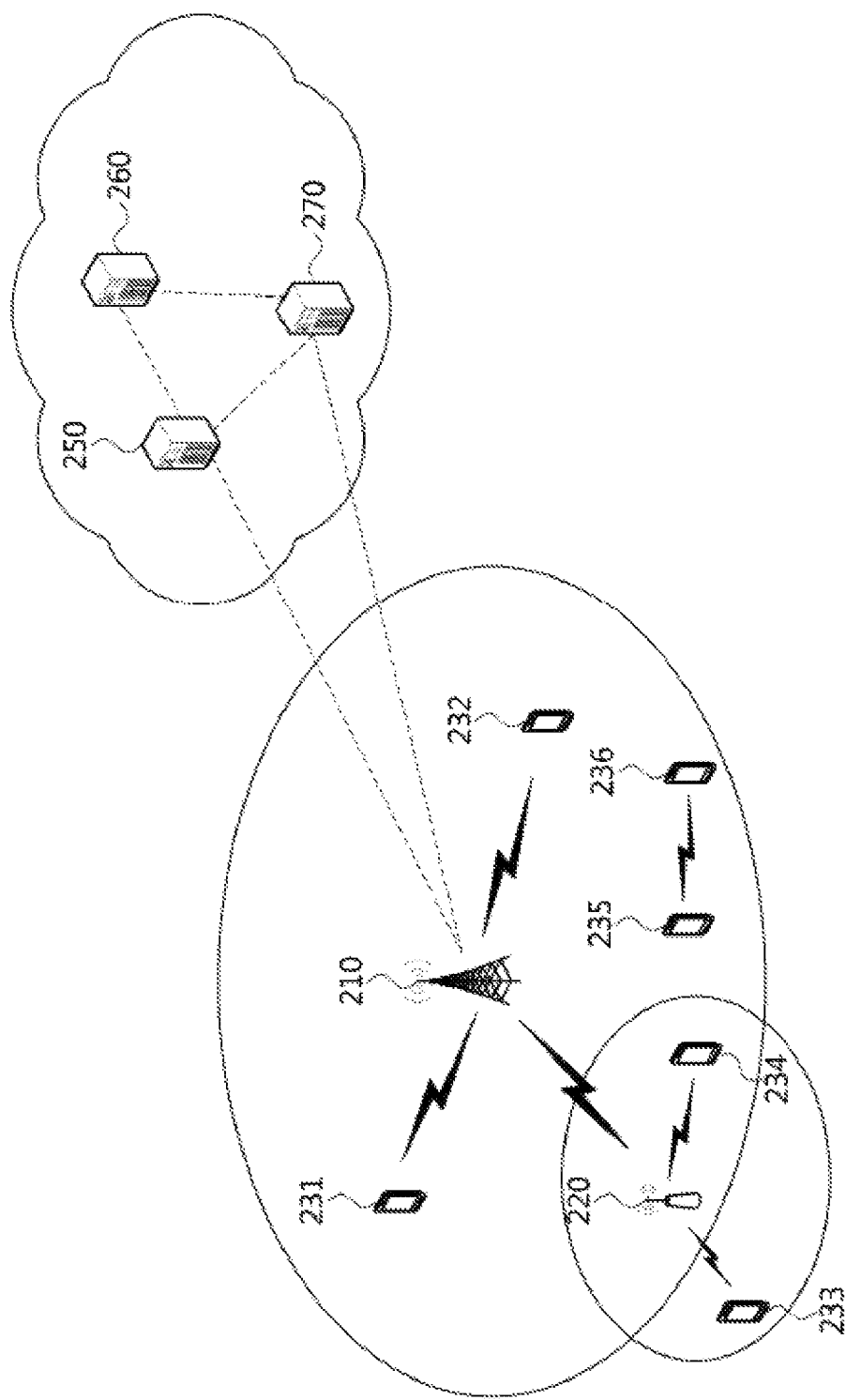
FIG. 2 is a conceptual diagram illustrating embodiments of a cellular communication system.

FIG. 2 is a conceptual diagram illustrating embodiments of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Also, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
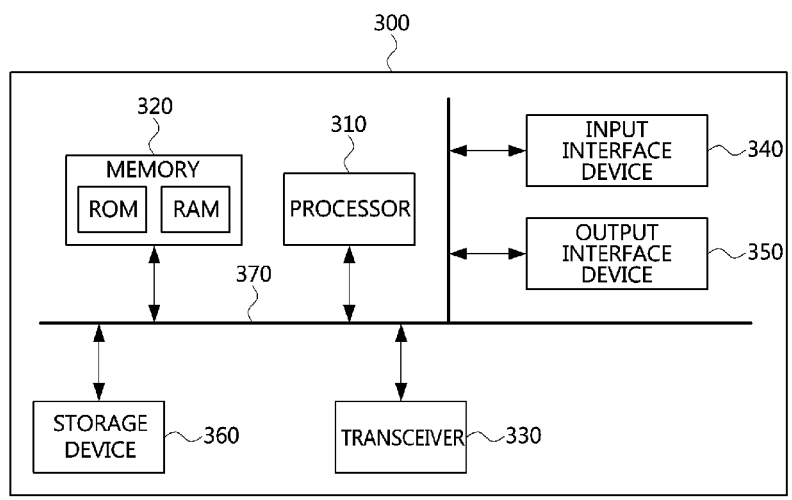
FIG. 3 is a conceptual diagram illustrating embodiments of a communication node constituting a cellular communication system.

FIG. 3 is a conceptual diagram illustrating embodiments of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
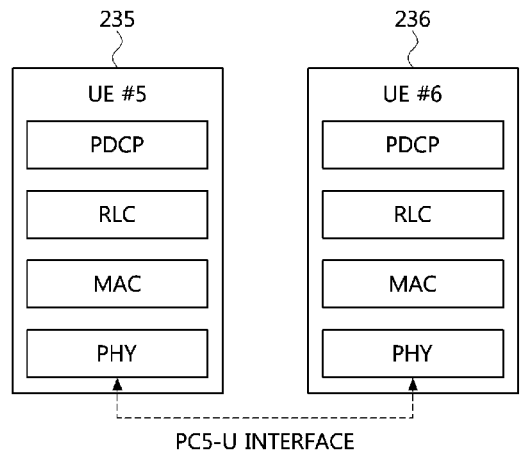
FIG. 4 is a block diagram illustrating embodiments of a user plane protocol stack of an UE performing sidelink communication.

FIG. 4 is a block diagram illustrating embodiments of a user plane protocol stack of an UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
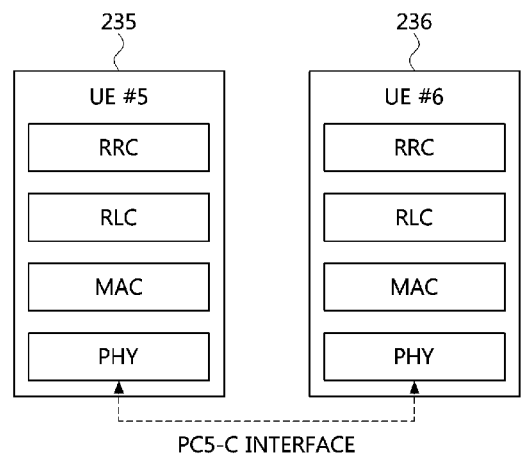
FIG. 5 is a block diagram illustrating a first embodiment of a control plane protocol stack of an UE performing sidelink communication.
Figure 6:
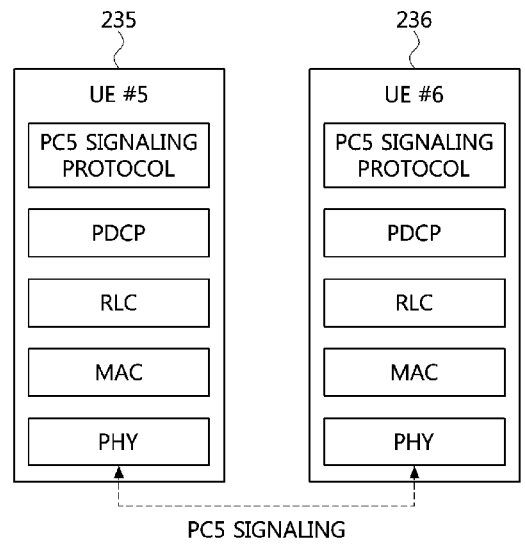
FIG. 6 is a block diagram illustrating a second embodiment of a control plane protocol stack of an UE performing sidelink communication.

FIG. 5 is a block diagram illustrating a first embodiment of a control plane protocol stack of an UE performing sidelink communication, and FIG. 6 is a block diagram illustrating a second embodiment of a control plane protocol stack of an UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236.

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base |

TABLE 2-continued

| Sidelink TM | Description |
|---|---|
| | station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Next, methods for transmitting and receiving data through heterogeneous RATs in the communication system (e.g., cellular communication system) supporting the V2X communication as described above will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a first vehicle is described, a corresponding second vehicle may perform an operation corresponding to the operation of the first vehicle. Conversely, when an operation of the second vehicle is described, the corresponding first vehicle may perform an operation corresponding to the operation of the second vehicle. In the embodiments described below, the operation of the vehicle may be the operation of the communication node located in the vehicle.

Meanwhile, a terminal located in a vehicle in the communication system supporting the V2X communication (hereinafter referred to as 'V2X communication system' may support multiple RATs. For example, the terminal may support 3GPP communication technology (e.g., 4G communication technology and/or 5G communication technology) and non-3GPP communication technology (e.g., communication technology defined in the IEEE). The communication technology defined in the IEEE may be a wireless local area network (WLAN), a wireless personal area network, a wireless access in vehicular environment (WAVE), and the like. A protocol stack of the terminal supporting a plurality of RATs may be configured as follows.

Figure 7:
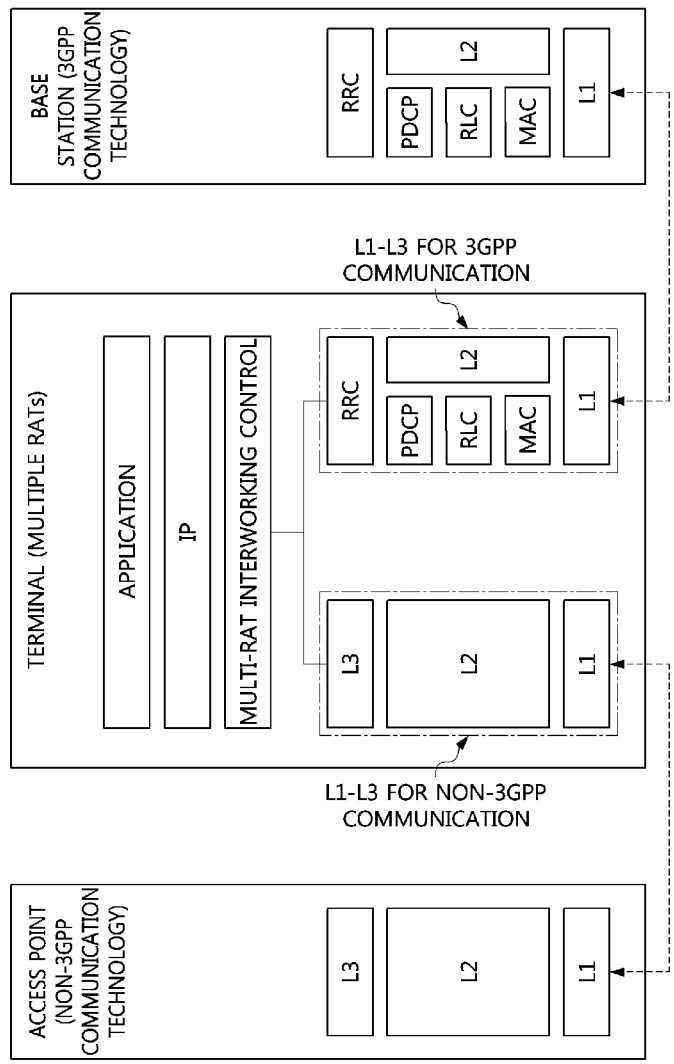
FIG. 7 is a block diagram illustrating a first embodiment of a protocol stack of a terminal supporting multiple RATs in a V2X communication system.

FIG. 7 is a block diagram illustrating a first embodiment of a protocol stack of a terminal supporting multiple RATs in a V2X communication system.

As shown in FIG. 7, a terminal (e.g., a terminal located in a vehicle) may support multiple RATs, and may support layers 1 to 3 (L1-L3) for the 3GPP communication and layers 1 to 3 (L1-L3) for the non-3GPP communication. Here, the terminal may support TM 3 and TM 4 defined in Table 2. Also, L1 may be a PHY layer, L2 may include a MAC layer, an RLC layer, and a PDCP layer, and L3 may be an RRC layer. The terminal may perform V2X communication with a base station supporting the 3GPP communication technology (e.g., 4G communication technology and/or 5G communication technology) using the L1-L3 for the 3GPP communication. The terminal may perform V2X communication with an access point supporting the non-3GPP communication technology (e.g., WLAN, WPAN, or WAVE) using the L1-L3 for the non-3GPP communication. Here, the access point may operate as the base station.

The terminal may further comprise a multi-RAT interworking control layer, an Internet protocol (IP) layer, and an application layer. The multi-RAT interworking control layer may be used to support communications between communication nodes supporting different RATs. For example, the multi-RAT interworking control layer may transfer a signal received from the base station supporting the 3GPP communication technology to the access point supporting the non-3GPP communication technology. In addition, the multi-RAT interworking control layer may transmit a signal received from the access point supporting the non-3GPP communication technology to the base station supporting the 3GPP communication technology. The multi-RAT interworking control layer may be an upper layer of the L3. Alternatively, the multi-RAT interworking control layer may be included in the L3. The application layer may support intelligent transport system (ITS) related functions.

The base station supporting the 3GPP communication technology may also include L1-L3 (e.g., PHY layer, MAC layer, RLC layer, PDCP layer, RRC layer), and the L1-L3 included in the base station may respectively correspond to the L1-L3 included in the terminal. The access point supporting the non-3GPP communication technology may also include L1-L3, and the L1-L3 included in the access point may respectively correspond to the L1-L3 for the non-3GPP communication included in the terminal.

Figure 8:
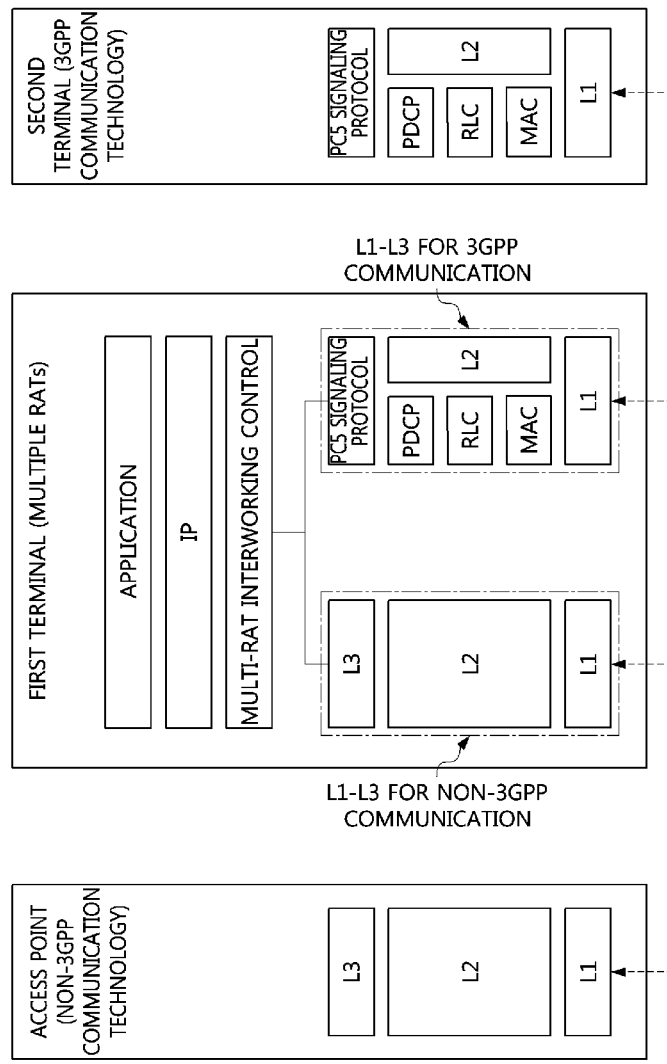
FIG. 8 is a block diagram illustrating a second embodiment of a protocol stack of a terminal supporting multiple RATs in a V2X communication system.

FIG. 8 is a block diagram illustrating a second embodiment of a protocol stack of a terminal supporting multiple RATs in a V2X communication system.

As shown in FIG. 8, a first terminal (e.g., a terminal located in a vehicle) may support multiple RATs, and may support layers 1 to 3 (L1-L3) for the GPP communication and layers 1 to 3 (L1-L3) for the non-3GPP communication. Here, the first terminal may support TM 3 and TM 4 defined in Table 2. The protocol stack shown in FIG. 8 may be used for a connection establishment procedure, a connection maintenance procedure, and a connection release procedure between the first terminal and a second terminal. Also, L1 may be a PHY layer, L2 may include a MAC layer, an RLC layer, and a PDCP layer, and L3 may be a PC5 signaling protocol layer. The PC5 signaling protocol layer may support a connection establishment/maintenance/release procedure. The first terminal may perform V2X communication with the second terminal supporting the 3GPP communication technology (e.g., 4G communication technology and/or 5G communication technology) using the L1-L3 for the 3GPP communication. The first terminal may perform V2X communication with the access point supporting the non-3GPP communication technology (e.g., WLAN, WPAN, or WAVE) using the L1-L3 for the non-3GPP communication.

The first terminal may further comprise a multi-RAT interworking control layer, an IP layer, and an application layer. The multi-RAT interworking control layer may be used to support communications between communication nodes supporting different RATs. For example, the multi-RAT interworking control layer may transfer a signal received from the second terminal supporting the 3GPP communication technology to the access point supporting the non-3GPP communication technology. In addition, the multi-RAT interworking control layer may transmit a signal received from the access point supporting the non-3GPP communication technology to the second terminal supporting the 3GPP communication technology. The multi-RAT interworking control layer may be an upper layer of the L3. Alternatively, the multi-RAT interworking control layer may be included in the L3. The application layer may support ITS-related functions.

The second terminal supporting the 3GPP communication technology may also include L1-L3 (e.g., PHY layer, MAC layer, RLC layer, PDCP layer, PC5 signaling protocol layer), and the L1-L3 included in the second terminal may respectively correspond to the L1-L3 for the 3GPP communication included in the first terminal. The access point supporting the non-3GPP communication technology may also include L1-L3, and the L1-L3 included in the access point may respectively correspond to the L1-L3 for the non-3GPP communication included in the first terminal.

Meanwhile, the terminal supporting the multiple RATs may be connected to both the base station supporting the 3GPP communication technology and the access point supporting the non-3GPP communication technology. That is, the terminal may support dual connectivity (DC). The terminal may perform V2X communication with the base station supporting the 3GPP communication technology, and may perform V2X communication with the access point supporting the non-3GPP communication technology instead of the base station supporting the 3GPP communication technology when a predefined event occurs.

For example, the terminal may perform V2X communication with the access point supporting the non-3GPP communication technology when one of the following events occurs.

Event #1: When a CBR measurement result is greater than or equal to a preset threshold value Event #2: When importance of data to be transmitted is higher than a preset reference When the event #1 occurs, the V2X communication may be performed as follows.

FIG. 9 is a sequence chart illustrating a first embodiment of a V2X communication method over a heterogeneous RAT in a V2X communication system.

As shown in FIG. 9, a V2X communication system may comprise a base station supporting the 3GPP communication technology, an access point supporting the non-3GPP communication technology, and a terminal (e.g., a terminal located in a vehicle) supporting multiple RATs. Each of the base station, the access point, and the terminal may be configured to be the same as or similar to the communication node 300 shown in FIG. 3. Further, protocol stacks of the base station, the access point, and the terminal, respectively, may be configured to be the same as or similar to the protocol stack shown in FIG. 7.

The terminal may perform a connection establishment procedure with the base station. For example, the L1-L3 for the 3GPP communication (hereinafter referred to as '3GPP L1-L3') included in the terminal may generate an RRC connection request message including information indicating that the terminal supports multiple RATs, and transmit the generated RRC connection request message to the base station (S901). The RRC connection request message may further include information on the multiple RATs (e.g., information on the RAT supporting the non-3GPP communication technology) supported by the terminal. The base station may receive the RRC connection request message from the terminal and may determine that the terminal supports the multiple RATs based on the information included in the received RRC connection request message. When multi-RAT based operations (e.g., V2X communication with the access point supporting the non-3GPP communication technology) are allowed, the base station may generate an RRC connection setup message including an allowance indicator indicating that the multi-RAT based operations are allowed.

Also, the RRC connection setup message may further include parameters defined in Table 3 below. In Table 3, a CBR threshold may be a specific value or a specific range. When the CBR threshold indicates a specific range, the terminal may select a specific value within the specific range of the CBR threshold.

TABLE 3

| | Description |
| --- | --- |
| CBR threshold | Threshold for determining a channel busy ratio (CBR) based on a CBR measurement result |
| AP list | Information on access points located adjacently to the base station (e.g., identifiers of APs, basic service set identifiers (BSSIDs), etc.) |

Alternatively, the RRC connection setup message may further include parameters defined in Table 4 below. In Table 4, each of CBR thresholds #1 and #2 may be a specific value or a specific range. The CBR threshold #1 may be different from the CBR threshold #2. When the speed of the terminal is greater than or equal to a speed threshold, the terminal may use the CBR threshold #1. Here, when the CBR threshold #1 indicates a specific range, the terminal may select a specific value within the specific range of the CBR threshold #1. When the speed of the terminal is less than the speed threshold, the terminal may use the CBR threshold #2. Here, when the CBR threshold #2 indicates a specific range, the terminal may select a specific value within the specific range of the CBR threshold #2.

TABLE 4

| | Description |
| --- | --- |
| CBR threshold #1 | Threshold for determining a CBR based on a CBR measurement result, and used when the speed of the |

TABLE 4-continued

| | Description |
|---|---|
| | terminal is greater than or equal to the speed threshold |
| CBR threshold #2 | Threshold for determining a CBR based on a CBR measurement result, and used when the speed of the terminal is less than the speed threshold |
| Speed threshold | Threshold for selecting the CBR threshold #1 or #2 |
| AP list | Information on access points located adjacently to the base station (e.g., identifiers of APs, basic service set identifier (BSSID), etc.) |

The base station may transmit to the terminal the RRC connection setup message including the allowance indicator and the parameters defined in Table 3 or the allowance indicator and the parameters defined in Table 4 (S902). Here, the parameters defined in Table 3 or the parameters defined in Table 4 may be transmitted from the base station to the terminal through another RRC message or downlink control information (DCI). The terminal may receive the RRC connection setup message from the base station, and identify the allowance indicator and the parameters defined in Table 3 or the allowance indicator and the parameters defined in Table 4 included in the received RRC connection setup message.

Meanwhile, when the multi-RAT based operations are allowed and data (e.g., V2X data) is generated in the terminal, the terminal (e.g., 3GPP L1-L3) may measure a CBR (S903). The terminal may compare a CBR measurement result with the CBR threshold (e.g., the CBR threshold indicated by the RRC connection setup message). For example, when the RRC connection setup message includes the speed threshold, the terminal may compare its current speed with the speed threshold, and if the current speed is greater than or equal to the speed threshold, the terminal may compare the CBR measurement result with the CBR threshold #1. Alternatively, if the current speed of the terminal is less than the speed threshold, the terminal may compare the CBR measurement result with the CBR threshold #2.

When the CBR measurement result is greater than or equal to the CBR threshold (e.g., CBR threshold #1 or CBR threshold #2), the terminal may determine that the channel is congested. Accordingly, the terminal may determine to perform V2X communication through the access point supporting the non-3GPP communication technology. In this case, the RRC layer for the 3GPP communication (hereinafter referred to as '3GPP RRC layer') included in the terminal may transmit, to the multi-RAT interworking control layer included in the terminal, an interworking request message requesting to perform V2X communication with the access point supporting the non-3GPP communication technology instead of the base station (S904). The interworking request message may include information related to data generated in the terminal. The data related information may include at least one of a size of data, a priority of the data, a quality of service (QoS) of the data, a transmission cycle of the data, a type of the data (e.g., ultra-reliable and low-latency communication (URLLC) data or enhanced mobile broadband (eMBB) data), and data transmission requirements. The URLLC data may be data transmitted according to URLLC requirements, and the eMBB data may be data transmitted according to eMBB requirements.

The multi-RAT interworking control layer may receive the interworking request message from the 3GPP RRC layer of the terminal, and transmit the received interworking request message to the RRC layer for non-3GPP communication (hereinafter referred to as 'non-3GPP RRC layer') of the terminal (S905). In this case, the multi-RAT interworking control layer may generate the interworking request message according to the non-3GPP communication protocol by reconfiguring the interworking request message (e.g., the interworking request message generated according to the 3GPP communication protocol) received from the 3GPP RRC layer of the terminal according to the non-3GPP communication protocol. The non-3GPP RRC layer of the terminal may receive the interworking request message from the multi-RAT interworking control layer, and identify the information included in the received interworking request message.

When a connection between the terminal and the access point is not established, the L1-L3 for the non-3GPP communication (hereinafter referred to as 'non-3GPP L1-L3') included in the terminal may perform a connection establishment procedure with the access point (S906). Here, the terminal may perform the connection establishment procedure with one or more access points among the access points belonging to the AP list included in the RRC connection setup message.

When the terminal is connected to the access point, the terminal (e.g., non-3GPP L1-L3) may generate a resource request message including the data related information (e.g., the data related information obtained from the interworking request message), and may transmit the resource request message to the access point (S907). The resource request message may be transmitted in the connection establishment procedure between the terminal and the access point.

The access point may receive the resource request message from the terminal, and identify the data related information included in the received resource request message. When there is a resource for transmitting data indicated by the data related information, the access point may generate a resource allocation message including information on the corresponding resource and transmit the resource allocation message to the terminal (S908). The resource allocation message may include time-frequency resource information (e.g., channel information, time period information) allocated for data transmission. Also, the resource allocation message may further include information indicating an offset period. The offset period may be configured to be shorter than the time period indicated by the resource allocation message. A start point of the offset period may be the same as a start point of the time period, and the access point may release the time-frequency resource allocated for the terminal when no data is received from the terminal within the offset period.

The terminal (e.g., non-3GPP L1-L3) may receive the resource allocation message from the access point, and identify the time-frequency resource information included in the received resource allocation message. In this case, the non-3GPP RRC layer of the terminal may generate an interworking response message indicating that the resource for data transmission is allocated, and may transmit the generated interworking response message to the multi-RAT interworking control layer (S909). The multi-RAT interworking control layer may receive the interworking response message from the non-3GPP RRC layer of the terminal and may transmit the received interworking response message to the 3GPP RRC layer of the terminal (S910). In this case, the multi-RAT interworking control layer may generate the interworking response message according to the 3GPP communication protocol by reconfiguring the interworking response message (i.e., the interworking response message generated according to the non-3GPP communication technology) received from the non-3GPP RRC layer of the terminal according to the 3GPP communication protocol.

The 3GPP RRC layer of the terminal may receive the interworking response message from the multi-RAT interworking control layer, and determine that the resource for data transmission is allocated based on the interworking response message. In this case, the 3GPP RRC layer of the terminal may transmit generated data (e.g., V2X data) to the multi-RAT interworking control layer (S911). The multi-RAT interworking control layer may receive the data from the 3GPP RRC layer of the terminal and may transmit the received data to the non-3GPP RRC layer of the terminal (S912). In this case, the multi-RAT interworking control layer may generate the data according to the non-3GPP communication protocol by reconfiguring the data (e.g., data generated according to the 3GPP communication protocol) received from the 3GPP RRC layer of the terminal according to the non-3GPP communication protocol. The non-3GPP L1-L3 of the terminal may transmit the data received from the multi-RAT interworking control layer to the access point (S913).

Also, when the interworking response message is received from the multi-RAT interworking control layer, the terminal (e.g., 3GPP L1-L3) may transmit to the base station an interworking report message including information requesting to perform V2X communication with the access point (S914). The interworking report message may further include an identifier (e.g., BSSID) of the access point performing V2X communication. The base station may receive the interworking report message from the terminal, and may determine that the V2X communication between the terminal and the access point is performed based on the received interworking report message.

Then, the terminal may periodically perform CBR measurements. When the CBR measurement result (i.e., CBR measurement result in a channel configured by the base station) is less than the CBR threshold (e.g., CBR threshold #1 or CBR threshold #2), the terminal may determine that the V2X communication is performed with the base station instead of the access point. In this case, the terminal (e.g., 3GPP L1-L3) may transmit an interworking release message to the base station indicating that the interworking between the terminal and the access point is released (S915). The base station may receive the interworking release message from the terminal, and may determine that the interworking between the terminal and the access point is released based on the received interworking release message.

When the event #2 occurs, the V2X communication may be performed as follows.

FIG. 10 is a sequence chart illustrating a second embodiment of a V2X communication method over a heterogeneous RAT in a V2X communication system.

As shown in FIG. 10, a V2X communication system may comprise a base station supporting the 3GPP communication technology, an access point supporting the non-3GPP communication technology, and a terminal (e.g., a terminal located in a vehicle) supporting multiple RATs. Each of the base station, the access point, and the terminal may be configured to be the same as or similar to the communication node 300 shown in FIG. 3. Further, protocol stacks of the base station, the access point, and the terminal, respectively, may be configured to be the same as or similar to the protocol stack shown in FIG. 7.

The terminal may perform a connection establishment procedure with the base station. For example, the terminal (e.g., 3GPP L1-L3) may generate an RRC connection request message including information indicating that the terminal supports multiple RATs, and transmit the generated RRC connection request message to the base station (S1001). The RRC connection request message may further include information on the multiple RATs (e.g., information on the RAT supporting the non-3GPP communication technology) supported by the terminal. The base station may receive the RRC connection request message from the terminal and may determine that the terminal supports the multiple RATs based on the information included in the received RRC connection request message. When multi-RAT based operations (e.g., V2X communication with the access point supporting the non-3GPP communication technology) are allowed, the base station may generate an RRC connection setup message including an allowance indicator indicating that the multi-RAT based operations are allowed.

Also, the RRC connection setup message may further include parameters defined in Table 5 below.

TABLE 5

| | Description |
|---|---|
| CBR threshold | Threshold for determining a CBR based on a CBR measurement result |
| Data type | Type of data that can be transmitted through another RAT (e.g., URLLC data or eMBB data) |
| AP list | Information on access points located adjacently to the base station (e.g., identifiers of APs, basic service set identifier (BSSID), etc.) |

Alternatively, the RRC connection setup message may further include parameters defined in Table 6 below.

TABLE 6

| | Description |
|---|---|
| CBR threshold #1 | Threshold for determining a CBR based on a CBR measurement result, and used when the speed of the terminal is greater than or equal to the speed threshold |
| CBR threshold #2 | Threshold for determining a CBR based on a CBR measurement result, and used when the speed of the terminal is less than the speed threshold |
| Speed threshold | Threshold for selecting the CBR threshold #1 or #2 |
| Data type | Type of data that can be transmitted through another RAT (e.g., URLLC data or eMBB data) |
| AP list | Information on access points located adjacently to the base station (e.g., identifiers of APs, basic service set identifier (BSSID), etc.) |

The base station may transmit to the terminal the RRC connection setup message including the allowance indicator and the parameters defined in Table 5 or the allowance indicator and the parameters defined in Table 6 (S1002). Here, the parameters defined in Table 5 or the parameters defined in Table 6 may be transmitted from the base station to the terminal through another RRC message or DCI. The terminal may receive the RRC connection setup message from the base station, and identify the allowance indicator and the parameters defined in Table 5 or the allowance indicator and the parameters defined in Table 6 included in the received RRC connection setup message.

Meanwhile, when the multi-RAT based operations are allowed and data (e.g., V2X data) is generated in the terminal, the terminal (e.g., 3GPP L1-L3) may determine importance of the data (S1003). When the importance of the data is higher than a preset reference, the terminal may determine that data can be transmitted through the access point supporting the non-3GPP communication technology. Here, the importance may be determined based on data transmission requirements (e.g., latency/reliability requirements) and QoS. Alternatively, when the type of data (e.g., URLLC data) generated at the terminal is the same as the type of data (e.g., URLLC data) indicated by the RRC connection setup message, the terminal may determine that the data can be transmitted through the access point supporting the non-3GPP communication technology.

When it is determined that the data can be transmitted through the access point supporting the non-3GPP communication technology, in order to secure a resource for the data in advance, the 3GPP RRC layer of the terminal may transmit an interworking request message requesting to perform V2X communication with the access point supporting the non-3GPP communication technology to the multi-RAT interworking control layer of the terminal (S1004). The interworking request message may include information related to the data generated in the terminal and CBR measurement related information. The data related information may include at least one of a size of the data, a priority of the data, a quality of service (QoS) of the data, a transmission cycle of the data, a type of the data (e.g., URLLC data or eMBB data), and data transmission requirements. The CBR measurement related information may include a CBR measurement cycle, a reselection counter, and the like.

The multi-RAT interworking control layer may receive the interworking request message from the 3GPP RRC layer of the terminal, and transmit the received interworking request message to the RRC layer for non-3GPP communication (hereinafter referred to as 'non-3GPP RRC layer') of the terminal (S1005). In this case, the multi-RAT interworking control layer may generate the interworking request message according to the non-3GPP communication protocol by reconfiguring the interworking request message (e.g., the interworking request message generated according to the 3GPP communication protocol) received from the 3GPP RRC layer of the terminal according to the non-3GPP communication protocol. The non-3GPP RRC layer of the terminal may receive the interworking request message from the multi-RAT interworking control layer and identify the information included in the received interworking request message.

When a connection between the terminal and the access point is not established, the L1-L3 for non-3GPP communication (hereinafter referred to as 'non-3GPP L1-L3') included in the terminal may perform a connection establishment procedure with the access point (S1006). Here, the terminal may perform the connection establishment procedure with one or more access points among the access points belonging to the AP list included in the RRC connection setup message.

When the terminal is connected to the access point, the terminal (e.g., non-3GPP L1-L3) may generate a resource request message including the data related information and the CBR measurement related information, and may transmit the resource request message to the access point (S1007). The resource request message may be transmitted in the connection establishment procedure between the terminal and the access point.

The access point may receive the resource request message from the terminal, and identify the data related information and the CBR measurement related information included in the received resource request message. When there is a resource for transmitting data indicated by the data related information in each CBR measurement period indicated by the CBR measurement related information, the access point may generate a resource allocation message including information on the corresponding resource and transmit the resource allocation message to the terminal (S1008). The resource allocation message may include time-frequency resource information (e.g., channel information, time period information) allocated for data transmission. Also, the resource allocation message may further include information indicating an offset period. The offset period may be configured to be shorter than the time period indicated by the resource allocation message. A start point of the offset period may be the same as a start point of the time period, and the access point may release the time-frequency resource allocated for the terminal when no data is received from the terminal within the offset period.

The terminal (e.g., non-3GPP L1-L3) may receive the resource allocation message from the access point, and identify the time-frequency resource information included in the received resource allocation message. In this case, the non-3GPP RRC layer of the terminal may generate an interworking response message indicating that the resource for data transmission is allocated, and may transmit the generated interworking response message to the multi-RAT interworking control layer (S1009). The multi-RAT interworking control layer may receive the interworking response message from the non-3GPP RRC layer of the terminal and may transmit the received interworking response message to the 3GPP RRC layer of the terminal (S1010). In this case, the multi-RAT interworking control layer may generate the interworking response message according to the 3GPP communication protocol by reconfiguring the interworking response message (i.e., the interworking response message generated according to the non-3GPP communication technology) received from the non-3GPP RRC layer of the terminal according to the 3GPP communication protocol.

The 3GPP RRC layer of the terminal may receive the interworking response message from the multi-RAT interworking control layer, and determine that the resource for data transmission is allocated based on the interworking response message.

After the interworking response message is received, the terminal (e.g., 3GPP L1-L3) may measure a CBR to transmit the data (S1011). The terminal may compare a measurement result with the CBR threshold (e.g., the CBR threshold indicated by the RRC connection setup message). For example, when the RRC connection setup message includes the speed threshold, the terminal may compare its current speed with the speed threshold, and if the current speed is greater than or equal to the speed threshold, the terminal may compare the CBR measurement result with the CBR threshold #1. Alternatively, if the current speed of the terminal is less than the speed threshold, the terminal may compare the CBR measurement result with the CBR threshold #2.

When the CBR measurement result is greater than or equal to the CBR threshold (e.g., CBR threshold #1 or CBR threshold #2), the terminal may determine that the channel is congested. Accordingly, the terminal may determine to perform V2X communication through the access point supporting the non-3GPP communication technology. In this case, the 3GPP RRC layer of the terminal may transmit the data (e.g., V2X data) to the multi-RAT interworking control layer (S1012). The multi-RAT interworking control layer may receive data from the 3GPP RRC layer of the terminal, and may transmit the received data to the non-3GPP RRC layer of the terminal (S1013). In this case, the multi-RAT interworking control layer may generate the data according to the non-3GPP communication protocol by reconfiguring the data (e.g., the data generated according to the 3GPP communication protocol) received from the 3GPP RRC layer of the terminal according to the non-3GPP communication protocol. The non-3GPP L1-L3 of the terminal may transmit the data received from the multi-RAT interworking control layer to the access point (S1014).

Also, when it is determined in the step S1011 that the V2X communication is performed through the access point supporting the non-3GPP communication technology, the terminal (e.g., 3GPP L1-L3) may transmit to the base station an interworking report message including information requesting to perform V2X communication with the access point (S1015). The interworking report message may further include an identifier (e.g., BSSID) of the access point performing V2X communication. The base station may receive the interworking report message from the terminal, and may determine that the V2X communication between the terminal and the access point is performed based on the received interworking report message.

Then, the terminal may periodically perform CBR measurements. When the CBR measurement result (i.e., CBR measurement result in a channel configured by the base station) is less than the CBR threshold (e.g., CBR threshold #1 or CBR threshold #2), the terminal may determine that the V2X communication is performed with the base station instead of the access point. In this case, the terminal (e.g., 3GPP L1-L3) may transmit an interworking release message to the base station indicating that the interworking between the terminal and the access point is released (S915). The base station may receive the interworking release message from the terminal, and may determine that the interworking between the terminal and the access point is released based on the received interworking release message.

While the embodiments of the present disclosure and their advantages have been described in detail, it should be understood that various changes, substitutions and alterations may be made herein without departing from the scope of the present disclosure.

What is claimed is:

1. An operation method of a terminal located in a vehicle supporting a vehicle-to-everything (V2X) communication system, the operation method comprising:
   transmitting, by the terminal, a radio resource control (RRC) connection request message to a base station supporting a first radio access technology (RAT), the RRC connection request message including information indicating that the terminal supports multiple RATs including at least a first RAT and a second RAT;
   receiving, by the terminal, a RRC connection setup message from the base station, the RRC connection setup message including information indicating that multi-RAT based operations are allowed;
   transmitting, by the terminal, a resource request message for requesting resource allocation for V2X communication to an access point supporting the second RAT when a channel busy ratio (CBR) measurement result is greater than or equal to a CBR threshold in a channel configured by the base station;
   receiving, by the terminal, from the access point a resource allocation message including resource allocation information in response to the resource request message; and
   transmitting, by the terminal, data to the access point using a radio resource indicated by the resource allocation message.

2. The operation method according to claim 1, wherein the terminal comprises layers 1 to 3 supporting the first RAT, layers 1 to 3 supporting the second RAT, and an interworking control layer for supporting interworking between the first RAT and the second RAT.

3. The operation method according to claim 1, wherein the RRC connection setup message further includes the CBR threshold and a list of access points including the access point supporting the second RAT.

4. The operation method according to claim 1, wherein the RRC connection setup message further includes a CBR threshold #1, a CBR threshold #2, and a speed threshold,
   the CBR threshold corresponds to the CBR threshold #1 when a speed of the terminal is greater than or equal to the speed threshold,
   the CBR threshold corresponds to the CBR threshold #2 when the speed of the terminal is less than the speed threshold, and
   the CBR threshold #1 is different from the CBR threshold #2.

5. The operation method according to claim 1, wherein the resource request message includes at least one of a size of the data transmitted to the access point, a transmission cycle of the data transmitted to the access point, a priority of the data transmitted to the access point, and transmission requirements of the data transmitted to the access point.

6. The operation method according to claim 1, wherein the resource allocation message includes information indicating the radio resource allocated by the access point and information indicating an offset period, and the radio resource is released when data is not received from the terminal within the offset period.

7. The operation method according to claim 1, further comprising, when the resource allocation message is received from the access point, transmitting, by the terminal, to the base station an interworking report message indicating that the terminal performs V2X communication with the access point.

8. An operation method of a terminal located in a vehicle supporting a vehicle-to-everything (V2X) communication system, the operation method comprising:
   transmitting, by the terminal, a radio resource control (RRC) connection request message to a base station supporting a first radio access technology (RAT), the RRC connection request message including information indicating that the terminal supports multiple RATs including at least a first RAT and a second RAT;
   receiving, by the terminal, a RRC connection setup message from the base station, the RRC connection setup message including information indicating that multi-RAT based operations are allowed;
   transmitting, by the terminal, a resource request message for requesting resource allocation for V2X communication to an access point supporting the second RAT when an importance of data generated by the terminal is higher than a preset reference;
   receiving, by the terminal, from the access point a resource allocation message including resource allocation information in response to the resource request message; and
   transmitting, by the terminal, the data generated by the terminal to the access point using a radio resource indicated by the resource allocation message when a channel busy ratio (CBR) of the data generated by the terminal is greater than or equal to a CBR threshold in a channel configured by the base station.

9. The operation method according to claim 8, wherein the terminal comprises layers 1 to 3 supporting the first RAT, layers 1 to 3 supporting the second RAT, and an interworking control layer for supporting interworking between the first RAT and the second RAT.

10. The operation method according to claim 8, wherein the importance of the data generated by the terminal is determined to be higher than the preset reference when the data includes ultra-reliable and low latency communication (URLLC) data.

11. The operation method according to claim 8, wherein the RRC connection setup message further includes a CBR threshold and a type of the data, and when the type of the data generated by the terminal is identical to a type indicated by the RRC connection setup message, the importance of the data generated by the terminal is determined to be higher than the preset reference.

12. The operation method according to claim 8, wherein
the RRC connection setup message further includes a CBR threshold #1, a CBR threshold #2, and a speed threshold,
the CBR threshold corresponds to the CBR threshold #1 when a speed of the terminal is greater than or equal to the speed threshold,
the CBR threshold corresponds to the CBR threshold #2 when the speed of the terminal is less than the speed threshold, and
the CBR threshold #1 is different from the CBR threshold #2.

13. The operation method according to claim 8, wherein the resource request message includes at least one of a size of the data generated by the terminal, a transmission cycle of the data generated by the terminal, a priority of the data generated by the terminal, and transmission requirements of the data generated by the terminal.

14. The operation method according to claim 8, wherein the resource allocation message includes information indicating the radio resource allocated by the access point and information indicating an offset period, and the radio resource is released when data is not received from the terminal within the offset period.

15. The operation method according to claim 8, further comprising, when the resource allocation message is received from the access point, transmitting, by the terminal, to the base station an interworking report message indicating that the terminal performs V2X communication with the access point.

16. A terminal located in a vehicle supporting a vehicle-to-everything (V2X) communication system, the terminal comprising:
a processor;
a first means performing function(s) of a first radio access technology (RAT) layer and operating based on control of the processor;
a second means performing function(s) of a second RAT layer and operating based on control of the processor;
a third means performing function(s) of an interworking control layer and operating based on control of the processor; and
a memory storing one or more instructions executable by the processor,
wherein the one or more instructions cause the processor to:

receive, by the first means, a radio resource control (RRC) connection setup message from the base station, the RRC connection setup message including information indicating that multi-RAT based operations are allowed, and transmit data to the third means when a channel busy ratio (CBR) measurement result is greater than or equal to a CBR threshold in a channel configured by the base station,
transfer, by the third means, the data received from the first means to the second means, and
transmit, by the second means, the data received from the third means to an access point using a radio resource configured by the access point supporting a second RAT.

17. The terminal according to claim 16, wherein the one or more instructions further cause the processor to:
transmit, by the first means, an interworking request message instructing the terminal to perform V2X communication with the access point to the third means when the CBR measurement result is greater than or equal to the CBR threshold,
transfer, by the third means, the interworking request message received from the first means to the second means,
when the interworking request message is received from the third means, transmit, by the second means, a resource request message requesting resource allocation for transmission of the data to the access point, and receive a resource allocation message including resource allocation information from the access point, and
the data transmitted to the third means is transmitted to the access point using the radio resource indicated by the resource allocation information.

18. The terminal according to claim 17, wherein the one or more instructions further cause the processor to:
transmit, by the second means, an interworking response message indicating that the resource for the transmission of the data to the access point is allocated to the third means when the resource allocation message is received from the access point,
transmit, by the third means, the interworking response message received from the second means to the first means, and
receive, by the first means, the interworking response message from the third means.

19. The terminal according to claim 16, wherein the one or more instructions further cause the processor to:
transmit, by the first means, an interworking request message instructing the terminal to perform V2X communication with the access point to the third means when the importance of the data transmitted to the third means is determined to be higher than a preset reference after the RRC connection setup message is received,
transfer, by the third means, the interworking request message received from the first means to the second means,
transmit, by the second means, a resource request message requesting resource allocation for transmission of the data to the access point when the interworking request message is received from the third means, and receive a resource allocation message including resource allocation information from the access point, and a CBR measurement is performed after the resource allocation for the transmission of the data to the third means is completed.

* * * * *